March 18, 1952 R. B. SPRINKEL ET AL 2,589,975
DUAL CONTROL CLUTCH AND BRAKE MECHANISM FOR MOTOR VEHICLES
Filed Sept. 20, 1950 2 SHEETS—SHEET 2
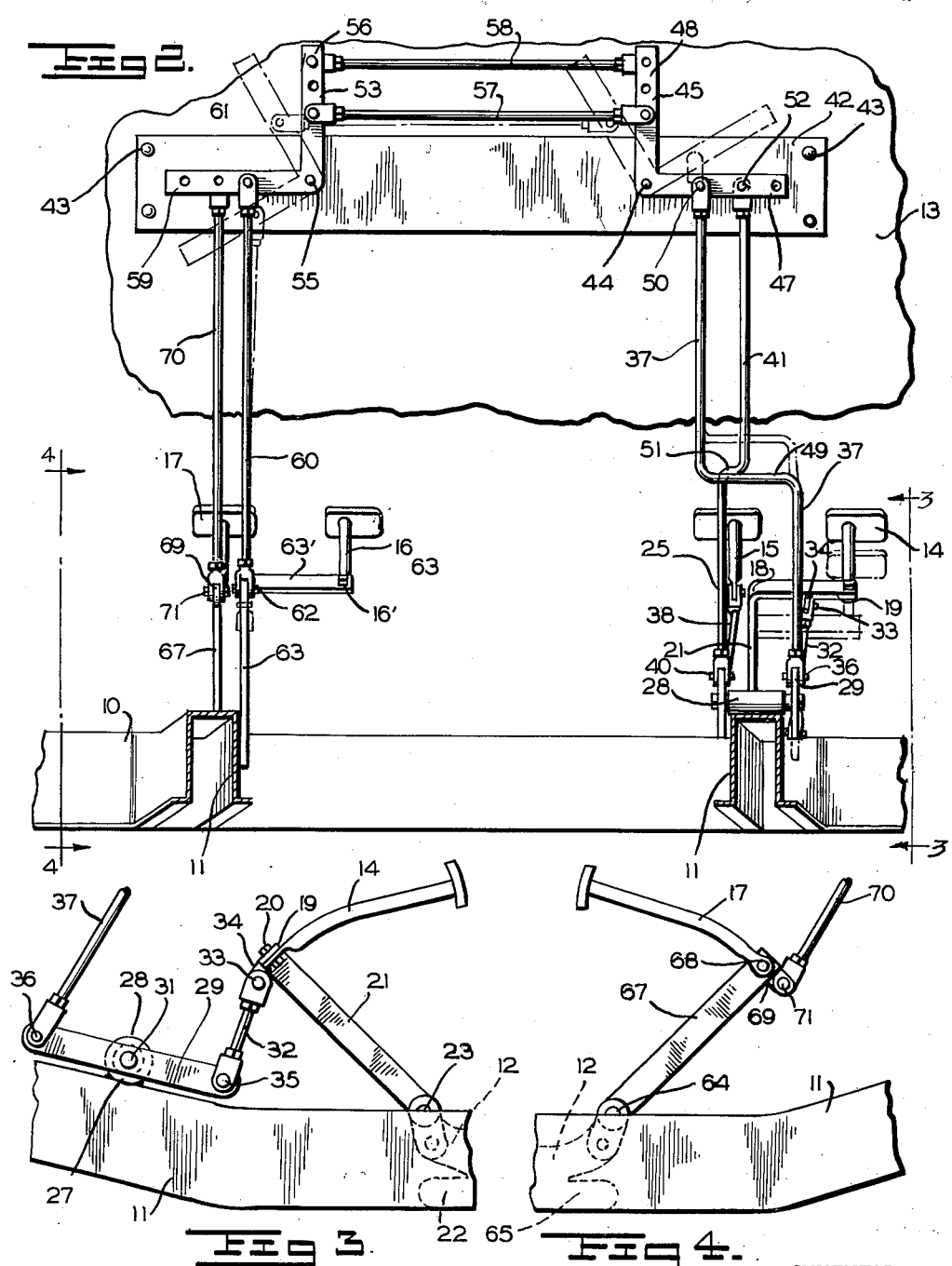
INVENTOR.
ROBERT B. SPRINKEL
HAVEN D. UMSTOTT
HAROLD E. KNIGHT JR.
ATTORNEYS Patented Mar. 18, 1952

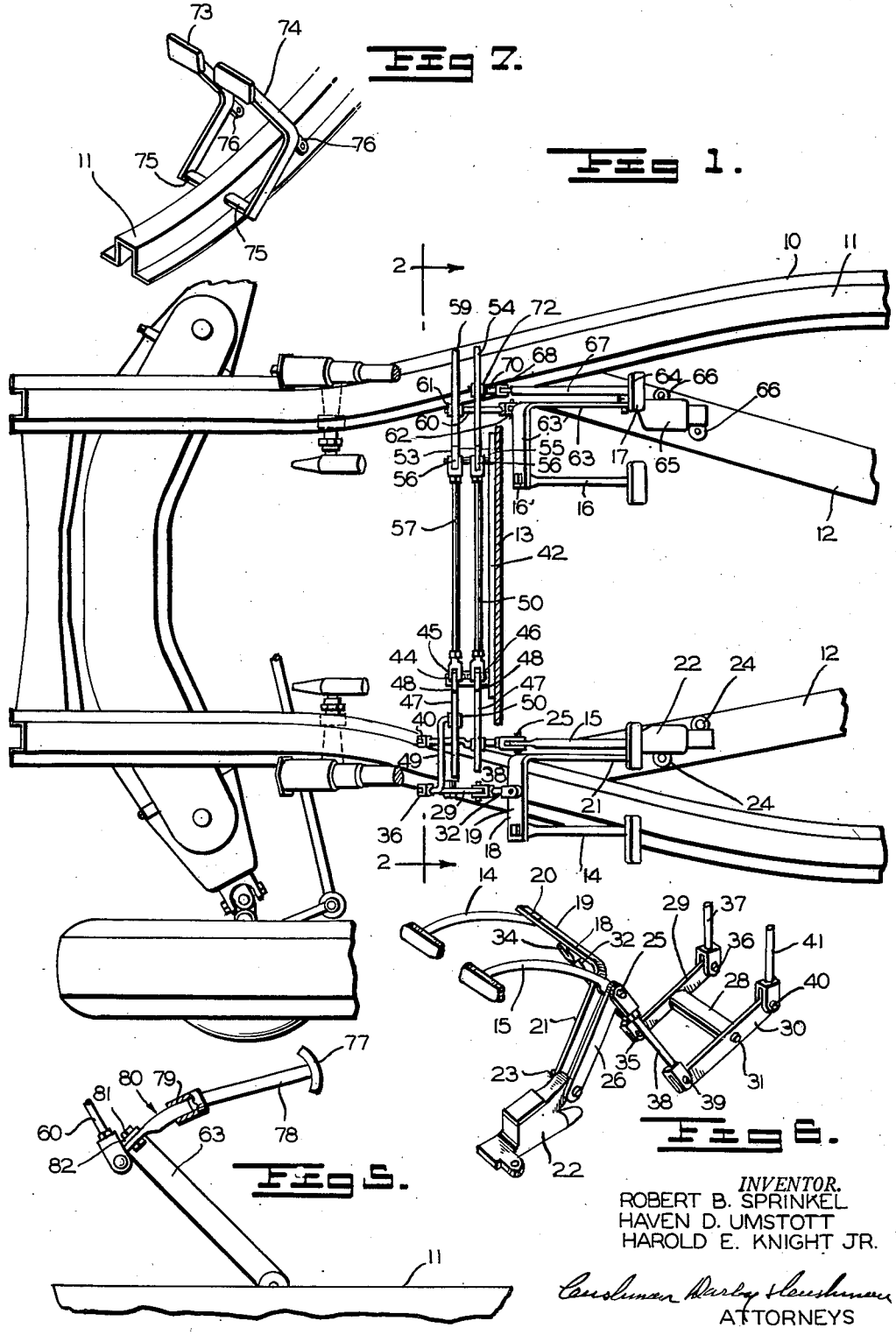

2,589,975

UNITED STATES PATENT OFFICE 2,589,975

DUAL CONTROL CLUTCH AND BRAKE
MECHANISM FOR MOTOR VEHICLES

Robert B. Sprinkel, Takoma Park, Md., Haven D.
Umstott, Washington, D. C., and Harold E.
Knight, Jr., Arlington, Va.

Application September 20, 1950, Serial No. 185,806

2 Claims. (Cl. 74—479)

1

The present invention relates to a new and improved dual control mechanism for motor vehicles and the like.

An important object is to provide simple, efficient, positive and economical dual control means for operatively connecting the main clutch and brake pedals of a motor vehicle to associated auxiliary pedals positioned adjacent the feet of the occupant of the vehicle adjacent to the driver, and in which the parts are so connected and arranged as to be immediately responsive to cause the simultaneous actuation of the clutch pedals or brake pedals so as to insure the efficient and smooth operation of the vehicle when under the control of either the driver or the occupant of the front seat next to the driver.

A further object comprehends the provision of a dual control mechanism with which brake pedals only are required, such as where an automatic transmission is provided so as to dispense with the use of a foot clutch pedal.

Other objects and advantages of the invention will become apparent from the following description when taken in conjunction with the accompanying claims and drawings.

Referring to the drawings in which is shown a preferred embodiment of the invention:

Figure 1 is a plan view of a chassis frame of a motor vehicle showing the dual pedal assembly associated therewith.

Figure 2 is a sectional view taken substantially along the line 2—2 of Figure 1.

Figure 3 is a detail side view looking in the direction of the arrows 3—3 of Figure 2.

Figure 4 is a detail side view looking in the direction of the arrows 4—4 of Figure 2.

Figure 5 is a detail sectional view of an improved detachable pedal.

Figure 6 is a detail perspective of the main clutch pedal and brake pedal assembly, and Figure 7 is a detail perspective of a modified form of connecting the clutch and brake pedals to the side bar of the chassis frame.

Referring to the drawings, 10 indicates the chassis frame of a motor vehicle and may include the conventional side channel bars 11 and diagonal reinforcing bars 12. Extending upwardly between the side bars 11 at the front of the chassis frame is the usual firewall 13. Arranged to extend through the footboard of the vehicle and adjacent the seat of the operator is the main or primary clutch pedal 14 and brake pedal 15, respectively. An auxiliary clutch pedal 16 and an auxiliary brake pedal 17 are positioned adjacent the feet of the occupant of the front seat

2 next to the driver and are operatively connected to the clutch pedal 14 and the brake pedal 15, respectively, so as to be simultaneously operated in a smooth and efficient manner by an improved pedal assembly. For use with certain makes of cars, the pedal assembly may include a substantially L-shaped member or lever 18 having a horizontal arm 19 (Fig. 6) connected as at 20 to the lower end of the clutch pedal 14 and having a vertical depending arm 21 pivotally connected to one side of a member or boss 22 by a transverse retaining pin 23. The member 22 is preferably mounted on one of the diagonal bars 12 (Fig. 1) of the chassis and may be secured thereto by the spaced bolts 24. The main brake pedal 15 is connected by a transverse bolt 25 (Fig. 6) to a link 26 that has its lower end pivotally connected to the side of the member 22 opposite the arm 21 by the bolt 23. Mounted on one of the side bars 11 of the chassis 10 and in front of the main clutch and brake pedals, is a fixed transverse bearing member 27 (Fig. 3) which is arranged to support a transverse tubular shaft or sleeve 28 to the opposite ends of which are pivotally connected the longitudinal levers or straps 29 and 30 by the transverse clamping bolt or pin 31 at points substantially centrally of the straps (Fig. 6). It will be seen that the levers 29 and 30 are independently tiltable or rockable about the pivot pin 31 upon raising or lowering their opposite ends. Depending from the horizontal arm 19 of the member 18 is a link 32 which is pivoted at its upper end as at 33 (Fig. 3) to a lug 34 on the arm 19. The opposite or lower end of the link 32 is pivoted as at 35 to one end of the lever 29 which at its opposite end is pivotally connected as at 36 to an upwardly extending rod 37. Similarly, a depending link 38 (Fig. 6) is connected to the brake pedal 15 and to the strap 26 by the transverse bolt 25, and the opposite end of the link 38 is pivotally connected as at 39 to one end of the tiltable lever 30. The opposite end of the lever 30 is connected as at 40 to an upwardly extending rod 41. Thus, it will be seen that a rockable connection is provided between the links 32 and 38 and their associated rods 37 and 41, so that depression of the clutch pedal 14 by the foot of the operator will cause the inner end of the lever 29 to be lowered and simultaneously the opposite end to be raised to elevate the rod 37. Likewise, depression of the brake pedal 15 lowers the inner end of the lever 30 and elevates the rod 41 connected to the opposite end thereof.

A transversely disposed plate 42 is connected to the front face of the firewall 13 in any suitable manner such as by the bolts 43 (Fig. 2) and is positioned above the foot pedals and adjacent the dash of the vehicle. A fixed pin 44 extends outwardly and laterally from the plate 42 and has pivotally connected thereto a pair of independently operable bell cranks or levers 45 and 46, each having a substantially horizontally disposed lower arm 47 and a vertical arm 48. The rod 37 may be angularly offset or bent as at 49 (Fig. 2) and extends upwardly so as to be pivotally connected as at 50 to the arm 47 of the bell crank 45. The rod 41 may be similarly offset as at 51 and extends upwardly so as to be pivotally connected to the horizontal arm 47 of the bell crank 46 as at 52. Arranged in transverse alignment with the pair of bell cranks 45 and 46 are a complementary pair of bell cranks 53 and 54 (Fig. 1) which are pivotally connected to an outwardly extending shaft 55 on the plate 42. The vertical arm 56 of the bell crank 53 is connected by a transverse rod 57 to the vertical arm 48 of the bell crank 45 and the vertical arm 56 of the bell crank 54 is likewise connected by a transverse rod 58 to the vertical arm 48 of the bell crank 46. It will, therefore, be seen that actuation of either pair of bell cranks will cause the simultaneous actuation of its associated bell cranks.

To the horizontal arm 59 of the bell crank 53 is connected a depending rod 60 as at 61 (Fig. 2) and the lower end of this rod is connected as at 62 to an L-shaped member 63 which is pivotally connected by a transverse bolt 64 to a boss or member 65 secured as at 66 to one of the diagonal bars 12 (Fig. 1). The auxiliary clutch pedal 16 (Fig. 1) is connected as at 16' to the horizontal arm 63' of the member 63, and the arm 63' extends in the same direction as the arm 19 of the member 18, so that the clutch pedals are connected to these arms. A straight arm or rod 67 is pivotally connected at its lower end (Fig. 4) to the member 65 by the transverse bolt 64 on the side opposite to the L-shaped member 63, and is connected at its upper end by a pin 68 to the auxiliary brake pedal 17. A forwardly and downwardly extending lug 69 may be connected by the pin 68 to the member 67. A rod 70 is pivotally connected at its lower end, as at 71, to the lug 69, so that actuation of the pedal 17 will simultaneously cause the operation of the arm 67 and rod 70. The upper end of the rod 70 is pivotally connected as at 72 (Fig. 1) to an intermediate portion of the horizontal arm of the bell crank 54, so that actuation of either the brake pedal 15 or the auxiliary brake pedal 17 will cause simultaneous operation of the other brake pedal. Similarly, the actuation of either of the clutch pedals 14 or 16 will impart simultaneous movement to the other clutch pedal.

The L-shaped members 18 and 63 are arranged to be used with the dual control mechanism when the latter is associated with certain makes of cars. When the dual control mechanism is installed on other makes of motor vehicles, the foot pedals may be connected to the chassis, as shown in Figure 7. In this figure, the main clutch pedal is indicated as at 73 and the main brake pedal is indicated by the numeral 74. These pedals are pivotally connected as at 75 to one of the sides 11 of the chassis frame, so as to be independently operable and are each formed with depending lugs 76 to which may be connected links such as 32 and 38, previously described. Similarly, the auxiliary clutch and brake pedals may be pivotally connected to the opposite side of the chassis frame 10. In this form of the invention, it will be observed that the members 22 and 65 are omitted. Thus, the dual control mechanism can be installed on any type or make of car at a minimum expenditure of time, labor and cost. As the brake pedals in operation are subject to greater pressure and use than the clutch pedals, the L-shaped members 18 and 63 are connected to the clutch pedals 14 and 16 while the straight links 26 and 67 are attached to the brake pedals 15 and 17, respectively.

Each of the auxiliary foot pedals 16 and 17, instead of being fixedly connected to its associated actuating member, may be detachably connected thereto so as to be removed from the vehicle in order to provide more foot room for the occupant of the front seat next to the driver, when it is not desired to use the dual control mechanism. As particularly shown in Figure 5, a detachable foot pedal 77 is provided with a depending shank or stem 78 having a tubular or recessed lower end portion 79 arranged to slidably and detachably receive a lug 80 connected as at 81 to the horizontal arm 82 of the L-shaped member 63. As the recessed portion 79 of the stem 78 loosely receives the lug 80, it will be seen that in normal operation, the weight and downward pressure of the pedal 77 when engaging the lug 80 will tend to maintain the same in a fixed operative position, and that when it is desired to remove the pedal 77, this may be readily done by manually withdrawing the lower tubular portion 79 from the lug 80. Manifestly, the detachable pedal 77, with equal facility, may be detachably connected to a straight arm such as 67 or any other suitable means so as to conveniently position a clutch pedal or a brake pedal adjacent the seat of the driver of the vehicle, and easily remove the pedal when it is not to be used.

Thus, it will be seen that the dual control mechanism provides simple, efficient, compact, economical and positive means whereby either the driver or the auxiliary driver may, at any time, take over control of the operation of the vehicle and which insures the simultaneous actuation of the main brake pedal and the auxiliary brake pedal and also the main clutch pedal and the auxiliary clutch pedal upon the application of slight pressure and at a minimum of effort on the part of the operator. The attachment may be readily connected to any standard motor vehicle at a minimum expenditure of time and effort. The main clutch pedal 14 is connected to the clutch mechanism of the car in any well known and standard manner, and the main brake pedal 15 is similarly connected to the brake fluid control mechanism associated with the wheels of the vehicle. Moreover, the dual control mechanism may be used to operate a single main pedal and its associated auxiliary pedal when the clutch pedals are dispensed with and automatic means provided for operating the clutch.

It is to be understood that the forms of the invention shown and described are merely illustrative of preferred embodiments and that such changes may be made as come within the scope of the following claims.

We claim:

1. In combination with a chassis frame and the fire wall of a motor vehicle, a dual control pedal assembly including a main clutch pedal and a main brake pedal pivotally connected to one side of the chassis frame adjacent the seat of the operator of the vehicle, an auxiliary clutch pedal and an auxiliary brake pedal pivotally connected to the opposite side of the chassis frame so as to be operable by the foot of the occupant of the front seat adjacent the driver, means operatively connecting the main clutch pedal with the auxiliary clutch pedal, means operatively connecting the main brake pedal with the auxiliary brake pedal, said means including a fixed member transversely mounted on one side of the chassis frame, a pair of spaced independently operable levers pivotally connected to said fixed member, means operatively connecting one of said levers to said main clutch pedal, means operatively connecting the other lever to said main brake pedal, a main pair of bell crank levers pivotally connected to the fire wall, each of said levers having a rod extending upwardly therefrom and connected to an arm of one of said bell crank levers for actuating the same upon operation of either the main brake pedal or the main clutch pedal, an auxiliary pair of bell crank levers transversely spaced from the main bell crank levers and pivotally connected to said fire wall, means operatively connecting the main bell crank levers to the auxiliary bell crank levers, means operatively connecting the auxiliary clutch pedal to one of the auxiliary bell crank levers, and means operatively connecting the auxiliary brake pedal to the other auxiliary bell crank lever.

2. In combination with a chassis frame and a fire wall of a motor vehicle, a dual control pedal assembly including a main brake pedal pivotally connected to one side of the chassis frame adjacent the seat of the operator of the vehicle, an auxiliary brake pedal pivotally connected to the opposite side of the chassis frame so as to be operable by the foot of the occupant of the front seat adjacent the driver, means operatively connecting the main brake pedal with the auxiliary brake pedal, said means including a fixed member transversely mounted on one side of the chassis frame, a lever pivotally connected intermediate its ends to the fixed member, means operatively connecting one end of said lever to said main brake pedal, said lever at its opposite end having a rod extending upwardly therefrom, a main bell crank lever pivotally connected to the fire wall and to said rod, an auxiliary bell crank lever transversely spaced from the main bell crank lever and pivotally connected to said fire wall, means operatively connecting the main bell crank lever to the auxiliary bell crank lever, and means operatively connecting the auxiliary bell crank lever to the auxiliary brake pedal.

ROBERT B. SPRINKEL.
HAVEN D. UMSTOTT.
HAROLD E. KNIGHT, JR.

REFERENCES CITED

The following references are of record in the file of this patent:

UNITED STATES PATENTS

| Number | Name | Date |
|---|---|---|
| 707,706 | Lotspeich | Aug. 26, 1902 |
| 1,181,887 | Holby | May 2, 1916 |
| 1,261,425 | Murphy | Apr. 2, 1918 |
| 1,276,472 | Zeen | Aug. 20, 1918 |
| 1,558,697 | Marts | Oct. 27, 1925 |
| 1,600,305 | Ahalt | Sept. 21, 1926 |
| 2,077,150 | McWhirter et al. | Apr. 13, 1937 |
| 2,166,978 | Stack | July 25, 1939 |
| 2,406,261 | Sprinkel | Aug. 20, 1946 |
| 2,512,838 | Petty | June 27, 1950 |

FOREIGN PATENTS

| Number | Country | Date |
|---|---|---|
| 584,509 | Great Britain | Jan. 16, 1947 |